(12) United States Patent
Kim et al.

(10) Patent No.: US 7,880,823 B2
(45) Date of Patent: Feb. 1, 2011

(54) LIQUID CRYSTAL DISPLAY HAVING FIRST AND SECOND CHARGE-SHARING CAPACITORS

(75) Inventors: Sung-Woon Kim, Suwon-si (KR); Hee-Seop Kim, Hwasung-si (KR); Mee-Hye Jung, Suwon-si (KR); Jian Gang Lu, Suwon-si (KR); Seung-Hoon Lee, Yongin-si (KR); Kwang-Chul Jung, Sungnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 217 days.

(21) Appl. No.: 12/212,520

(22) Filed: Sep. 17, 2008

(65) Prior Publication Data

US 2009/0195719 A1    Aug. 6, 2009

(30) Foreign Application Priority Data

Jan. 31, 2008   (KR) ...................... 10-2008-0010184

(51) Int. Cl.
*G02F 1/1343*  (2006.01)
*G02F 1/136*  (2006.01)

(52) U.S. Cl. ............................ 349/39; 349/48; 349/144

(58) Field of Classification Search ................... 349/38, 349/39, 48, 144; 345/93
See application file for complete search history.

(56) References Cited

U.S. PATENT DOCUMENTS

2007/0097307 A1 * 5/2007 Kim et al. .................. 349/143

* cited by examiner

*Primary Examiner*—David Nelms
*Assistant Examiner*—Paul C Lee
(74) *Attorney, Agent, or Firm*—Innovation Counsel LLP

(57) ABSTRACT

A liquid crystal display (LCD) is provided that can improve lateral visibility while preventing a decrease in luminance. The LCD includes first and second gate lines which are arranged in parallel with each other and sequentially transmit a gate voltage; a data line which intersects the first and second gate lines and transmits a data voltage; a pixel electrode which is disposed in a pixel and includes first and second sub-pixel electrodes that are connected to each other through a first charge-sharing capacitor; a first switching device which is connected to the first gate line, the data line and the first sub-pixel electrode; a second switching device which is connected to the first sub-pixel electrode through a second charge-sharing capacitor; and a third switching device which is connected to the second gate line and the second sub-pixel electrode and is also connected to the first sub-pixel electrode through the second charge-sharing capacitor.

8 Claims, 4 Drawing Sheets

LIQUID CRYSTAL DISPLAY HAVING FIRST AND SECOND CHARGE-SHARING CAPACITORS

CROSS-REFERENCE TO RELATED APPLICATION

This application claims priority from Korean Patent Application No. 10-2008-0010184 filed on Jan. 31, 2008 in the Korean Intellectual Property Office, the disclosure of which is incorporated herein by reference in its entirety.

BACKGROUND OF THE INVENTION

1. Field of the Invention

The present invention relates to a display device, and, more particularly, to a liquid crystal display (LCD).

2. Description of the Related Art

Liquid crystal displays (LCD), which are one of the most widely used flat panel display devices, include two display panels with field-generating electrodes such as pixel and common electrodes mounted thereon, and a liquid crystal layer interposed between the two display panels. An LCD generates an electric field in a liquid crystal layer by applying voltages to field-generating electrodes, and thus determines the alignment of liquid crystal molecules of the liquid crystal layer and controls the polarization of incident light, thereby displaying an image.

The use of a vertically aligned (VA) mode LCD has become widespread because a VA mode LCD gives a high contrast ratio and a wide reference viewing angle. In a VA mode LCD, liquid crystal molecules are aligned perpendicularly to upper and lower display panels until an electric field is applied. The reference viewing angle refers to a viewing angle with a contrast ratio of 1:10, or an inter-gray luminance inversion limit angle.

In order to realize a wide viewing angle, cut portions or protrusions may be formed at field-generating electrodes of a VA mode LCD. Since the direction of the inclination of liquid crystal molecules is determined by such cut portions or protrusions, the direction of the inclination of the liquid crystal molecules can be appropriately altered, thereby widening the reference viewing angle.

However, the lateral side of a VA mode LCD has poor visibility compared to its front side. For example, in the case of a patterned vertically aligned (PVA) mode LCD having cut portions, the luminance becomes higher toward either lateral side of a PVA mode LCD. In some cases, the luminance difference between high grayscale levels disappears and an image displayed by a PVA mode LCD is distorted.

SUMMARY OF THE INVENTION

Aspects of the present invention provide a liquid crystal display (LCD) which can improve lateral visibility while preventing a decrease in luminance.

However, the objectives of the present invention are not restricted to the one set forth herein. The above and other objectives of the present invention will become apparent to one of daily skill in the art to which the present invention pertains by referencing the detailed description of the present invention given below.

According to an aspect of the present invention, there is provided an LCD including first and second gate lines which are arranged in parallel with each other and sequentially transmit a gate voltage; a data line which intersects the first and second gate lines and transmits a data voltage; a pixel electrode which is disposed in a pixel and includes first and second sub-pixel electrodes that are connected to each other through a first charge-sharing capacitor; a first switching device which is connected to the first gate line, the data line and the first sub-pixel electrode; a second switching device which is connected to the first sub-pixel electrode through a second charge-sharing capacitor; and a third switching device which is connected to the second gate line and the second sub-pixel electrode and is also connected to the first sub-pixel electrode through the second charge-sharing capacitor.

BRIEF DESCRIPTION OF THE DRAWINGS

The above and other aspects and features of the present invention will become apparent by describing in detail exemplary embodiments thereof with reference to the attached drawings, in which.

DETAILED DESCRIPTION OF THE EXEMPLARY EMBODIMENTS

Figure 1:
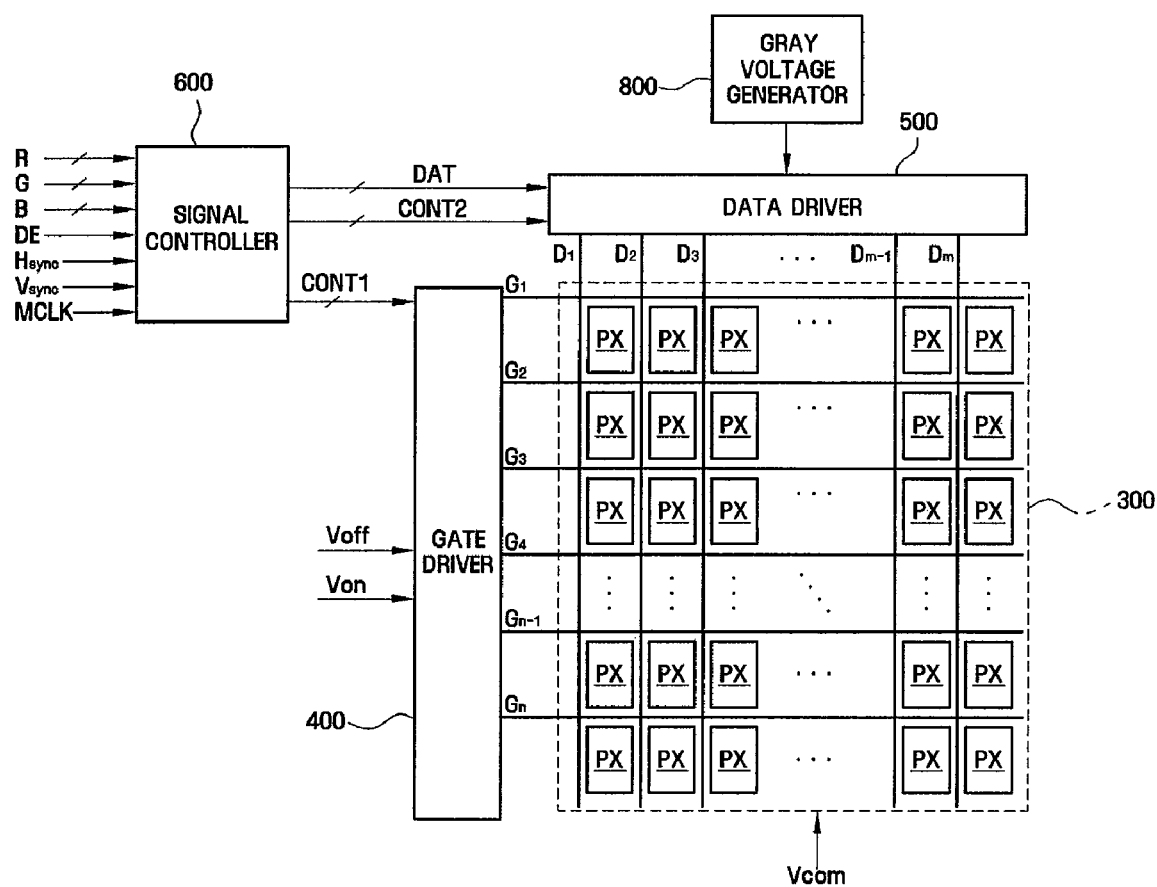
FIG. 1 illustrates a block diagram of a liquid crystal display (LCD) according to an embodiment of the present invention.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers refer to like elements throughout. As used herein the term "and/or" includes any and all combinations of one or more of the associated listed items.

It should be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Furthermore, relative terms such as "below," "beneath," or "lower," "above," and "upper" may be used herein to describe one element's relationship to another element as illustrated in the accompanying drawings. It will be understood that relative terms are intended to encompass different orientations of the device in addition to the orientation depicted in the accompanying drawings. For example, if the device in the accompanying drawings is turned over, elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the exemplary terms "below" and "beneath" can, therefore, encompass both an orientation of above and below.

Figure 2:
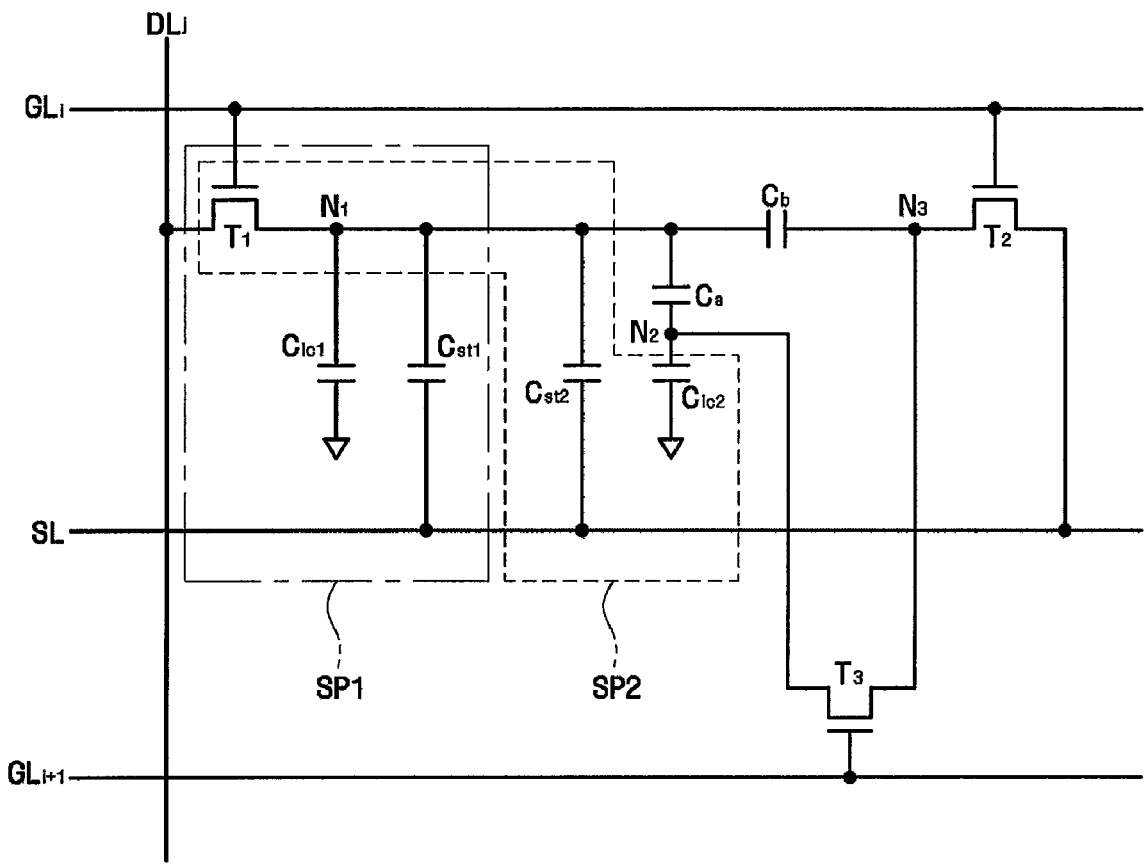
FIG. 2 illustrates a circuit diagram of the pixel of the LCD illustrated in FIG. 1.

A liquid crystal display (LCD) according to an embodiment of the present invention will hereinafter be described in detail with reference to FIGS. 1 and 2. FIG. 1 illustrates a block diagram of an LCD according to an embodiment of the present invention, and FIG. 2 illustrates a circuit diagram of a pixel of the LCD illustrated in FIG. 1.

Referring to FIG. 1, the LCD includes a liquid crystal panel assembly 300; a gate driver 400 and a data driver 500 which are both connected to the liquid crystal panel assembly 300; a gray voltage generator 800 which is connected to the data driver 500; and a signal controller 600 which controls the liquid crystal panel assembly 300, the gate driver 400, the data driver 500, and the gray voltage generator 800.

The liquid crystal panel assembly 300 includes a plurality of display signal lines and a plurality of pixels PX which are connected to the display signal lines and are arranged in a matrix. The liquid crystal panel assembly 300 may include a lower display panel (not shown) and an upper display panel (not shown) which face each other; and a liquid crystal layer (not shown) which is interposed between the lower display panel and the upper display panel.

The display signal lines may be disposed on the lower display panel. The display signal lines may include a plurality of gate lines $G_1$ through $G_n$ which transmit a gate signal and a plurality of data lines $D_1$ through $D_m$ which transmit a data signal. The gate lines $G_1$ through $G_n$ extend in a row direction and are almost parallel with one another, and the data lines $D_1$ through $D_m$ extend in a column direction and are almost parallel with one another.

Each of the pixels PX includes a switching device which is connected to a corresponding gate line and a corresponding data line, and a liquid crystal capacitor which is connected to the switching device. Each of the pixels PX may also include a storage capacitor, if necessary, which is connected in parallel to the liquid crystal capacitor.

Each of the switching devices of the pixels PX is a tri-terminal device and thus has a control terminal which is connected to a corresponding gate line, an input terminal which is connected to a corresponding data line and an output terminal which is connected to a corresponding liquid crystal capacitor.

The gate driver 400 is connected to the gate lines $G_1$ through $G_n$, applies a gate signal, which is the combination of a high-level gate signal (hereinafter referred to as the gate-on voltage Von) and a low-level gate signal (hereinafter referred to as the gate-off voltage Voff) that are both applied to the gate driver 400 by an external source, to the gate lines $G_1$ through $G_n$. Referring to FIG. 1, the gate driver 400 is disposed on one side of the liquid crystal panel assembly 300, and the gate lines $G_1$ through $G_n$ are all connected to the gate driver 400. However, the present invention is not restricted to this. That is, two gate drivers may be provided and disposed on both sides of the liquid crystal panel assembly 300, and the gate lines $G_1$ through $G_n$ are all connected to each of the two gate drivers. For example, in the case of a large-size LCD, it is difficult to properly transmit the gate-on voltage Von or the gate-off voltage Voff from one end to the other end of the gate lines $G_1$ through $G_n$ by using only one gate driver. In order to address this, two gate drivers may be provided. One of the gate drivers may be connected to one end of the gate lines $G_1$ through $G_n$, and the other gate driver may be connected to the other end of the gate lines $G_1$ through $G_n$. The gate driver 400 may be embedded in the liquid crystal panel assembly 300 as an integrated circuit having at least one thin-film transistor (TFT).

The gray voltage generator 800 generates a gray voltage, which is closely related to the transmittance of the pixels PX. The gray voltage is provided to each of the pixels PX and may have either a positive value or a negative value according to a common voltage Vcom.

The data driver 500 is connected to the data lines $D_1$ through $D_m$ of the liquid crystal panel assembly 300 and applies the gray voltage generated by the gray voltage generator 800 to the pixels PX as a data voltage. If the gray voltage generator 800 does not provide all gray voltages but provides only a reference gray voltage, the data driver 500 may generate various gray voltages by dividing the reference gray voltage, and select one of the various gray voltages as a data voltage.

The gate driver 400 or the data driver 500 may be integrated on the liquid crystal panel assembly 300 along with the display signal lines ($G_1$ through $G_n$ and $D_1$ through $D_m$) and TFTs. Alternatively, the gate driver 400 or the data driver 500 may be mounted on a flexible printed circuit film (not shown) and then attached to the liquid crystal panel assembly 300 as a TCP.

The signal controller 600 controls the operations of the gate driver 400 and the data driver 500.

The signal controller 600 receives an input image signal (R, G and B) and a plurality of input control signals for controlling the display of the input image signal, for example, a vertical synchronization signal $V_{sync}$, a horizontal synchronization signal $H_{sync}$, a main clock signal MCLK, and a data enable signal DE, from an external graphics controller (not shown). The signal controller 600 appropriately processes the input image signal (R, G and B) according to the input control signals, thereby generating image data DAT, which complies with the operating conditions of the liquid crystal panel assembly 300. Then, the signal controller 600 generates a gate control signal CONT1 and a data control signal CONT2, transmits the gate control signal CONT1 to the gate driver 400, and transmits the data control signal CONT2 and the image data DAT to the data driver 500.

The gate control signal CONT1 may include a scan start signal STV which initiates the operation of the gate driver 400, i.e., a scan operation, and at least one clock signal which controls when to output the gate-on voltage Von. The gate control signal CONT1 may also include an output enable signal OE which limits the duration of the gate-on voltage Von. The clock signal may be used as a selection signal SE.

The data control signal CONT2 may include a horizontal synchronization start signal STH which indicates the transmission of the image data DAT, a load signal LOAD which requests the application of a data voltage corresponding to the image data DAT to the data lines $D_1$ through $D_m$, and a data clock signal HCLK. The data control signal CONT2 may also include a reverse signal RVS for reversing the polarity of the data voltage with respect to the common voltage Vcom, which is referred to as the "polarity of the data voltage" hereinafter.

The data driver 500 receives the image data DAT from the signal controller 600 in response to the data control signal CONT2, converts the image data into a data voltage by selecting a gray voltage corresponding to the image data DAT from a plurality of gray voltages provided by the gray voltage generator 800. Then, the data driver 500 applies the data voltage to the data lines $D_1$ through $D_m$.

The gate driver 400 turns on the switching devices connected to the gate lines $G_1$ through $G_n$ by applying the gate-on voltage Von to the gate lines $G_1$ through $G_n$ in response to the gate control signal CONT1. Then, the data voltage applied to the data lines $D_1$ through $D_m$ is transmitted to each of the pixels PX through the switching devices that are turned on.

The difference between the data voltage applied to each of the pixels PX and the common voltage Vcom may be interpreted as a voltage that the liquid crystal capacitor of each of the pixels PX is charged with, i.e., a pixel voltage. The alignment of liquid crystal molecules in a liquid crystal layer varies according to the magnitude of a pixel voltage, and, thus, the polarization of light transmitted through the liquid crystal layer may also vary, thereby resulting in a variation in the transmittance of the liquid crystal layer.

In the embodiment of FIGS. 1 and 2, the same data voltage is provided to a pair of sub-pixels of a pixel PX. Thereafter, when the gate-on voltage Von is applied to a gate line adjacent to the pixel PX, the voltage of one of the sub-pixels is dropped by performing a charge-sharing operation. As a result, the sub-pixels of the pixel PX are charged with different voltages, and a gamma curve of the pixel PX becomes identical to a gamma curve obtained by synthesizing the gamma curves of the sub-pixels of the pixel PX. The charge-sharing operation may be performed so that a synthesized gamma curve for the front of an LCD and a synthesized gamma curve for either side of an LCD can both become similar to a reference gamma curve for the front of an LCD. In this manner, it is possible to improve the lateral visibility of an LCD.

Referring to FIG. 2, the LCD may include a plurality of gate lines $GL_i$ and $GL_{i+1}$ which transmit a gate voltage and a data line $DL_j$ which intersects the gate lines $GL_i$ and $GL_{i+1}$ and transmits a data voltage.

Referring to FIG. 2, a pixel, which belongs to an i-th row, includes a first sub-pixel SP1 and a second sub-pixel SP2. The first sub-pixel SP1 includes a first switching device T1, a first liquid crystal capacitor $C_{lc1}$, and a first storage capacitor $C_{st1}$. The second sub-pixel SP2 includes the first switching device T1, a second liquid crystal capacitor $C_{lc2}$, and a second storage capacitor $C_{st2}$. The first sub-pixel SP1 and the second sub-pixel SP2 are both driven by the first switching device T1.

The first switching device T1 is disposed at the intersection between the i-th gate line $GL_i$ and the j-th data line $DL_j$. A second switching device T2 is connected to the i-th gate line $GL_i$. A third switching device T3 is connected to the (i+1)-th gate line $GL_{i+1}$. Each of the first, second and third switching devices T1, T2 and T3 may include a TFT.

The first switching device T1 includes a control terminal which is connected to the j-th data line $DL_j$ and an output terminal which is connected to the first liquid crystal capacitor $C_{lc1}$ and the first storage capacitor $C_{st1}$. The output terminal of the first switching device T1 is connected to the second storage capacitor $C_{st2}$, and is also connected to the second liquid crystal capacitor $C_{lc2}$ through a first charge-sharing capacitor $C_a$. The second switching device T2 includes a control terminal which is connected to the i-th gate line $GL_i$, an output terminal which is connected to the output terminal of the first switching device T1 through a second charge-sharing capacitor $C_b$, and an input terminal which is connected to a storage line SL. Specifically, the input terminal of the second switching device T2 may be directly connected to the storage line SL. The third switching device T3 includes a control terminal which is connected to the (i+1)-th gate line $GL_{i+1}$, an input terminal which is connected between the first charge-sharing capacitor $C_a$ and the second liquid crystal capacitor $C_{lc2}$, and an output terminal which is connected to the output terminal of the second switching device T2. Therefore, the output terminal of the third switching device may be connected to the output terminal of the first switching device T1 through the second charge-sharing capacitor $C_b$.

The pixel belonging to the i-th row may also include a pixel electrode which has a first sub-pixel electrode (not shown) and a second sub-pixel electrode (not shown). The first sub-pixel electrode is connected to the output terminal of the first switching device T1, and the second sub-pixel electrode is connected to the output terminal of the first switching device T1 through the first charge-sharing capacitor $C_a$. A common electrode (not shown) may be formed on an upper display panel (not shown) that faces the display panel.

The first liquid crystal capacitor $C_{lc1}$ may include the first sub-pixel electrode, which is connected to the first switching device T1, the common electrode, and a liquid crystal material, which is interposed between the first sub-pixel electrode and the common electrode. The first storage capacitor $C_{st1}$ may include the first sub-pixel, the storage line SL, which is formed on the lower display panel, and a dielectric material, which is interposed between the first sub-pixel electrode and the storage line SL.

The second liquid crystal capacitor $C_{lc2}$ includes the second sub-pixel electrode, which is connected to the first switching device through the first charge-sharing capacitor $C_a$, the common electrode and a liquid crystal material, which is interposed between the second sub-pixel electrode and the common electrode. The second storage capacitor $C_{st2}$ includes the output terminal of the first switching device T1, the storage line SL, and a dielectric material, which is interposed between the output terminal of the first switching device T1 and the storage line SL.

The first charge-sharing capacitor $C_a$ includes the output terminal of the first switching device T1, the second sub-pixel electrode, and a dielectric material, which is interposed between the output terminal of the first switching device T1 and the second sub-pixel electrode. The second charge-sharing capacitor $C_b$ includes the output terminal of the first switching device T1, the output terminal of the second switching device T2 and a dielectric material, which is interposed between the output terminal of the first switching device T1 and the output terminal of the second switching device T2. When a pixel voltage is applied from the j-th data line $DL_j$ through the first switching device T1, the first charge-sharing capacitor $C_a$ reduces the difference between a pixel voltage that the first liquid crystal capacitor $C_{lc1}$ is charged with and a pixel voltage that the second liquid crystal capacitor $C_{lc2}$ is charged with. The first charge-sharing capacitor $C_a$, the second charge-sharing capacitor $C_b$, and the second switching device T2 reduce the pixel voltage that the first liquid crystal capacitor $C_{lc1}$ is charged with and increase the pixel voltage that the second liquid crystal capacitor $C_{lc2}$ is charged with.

The first and second storage capacitors $C_{st1}$ and $C_{st2}$ maintain the pixel voltages that the first and second liquid crystal capacitors $C_{lc1}$ and $C_{lc2}$ are respectively charged with. A fixed voltage, e.g., the common voltage Vcom, may be applied to the storage line SL.

When the gate-on voltage Von is applied to the i-th gate line $GL_i$, the data voltage is applied to the first and second sub-pixel electrodes of the pixel belonging to the i-th row. The first sub-pixel electrode, which is directly connected to the first switching device T1, is charged with a higher voltage than the second sub-pixel electrode, which is connected to the first switching device T1 through the first charge-sharing capacitor $C_a$. That is, the first liquid crystal capacitor $C_{lc1}$ is charged with a higher voltage than the second liquid crystal capacitor $C_{lc2}$. The voltages that the first and second liquid crystal capacitors $C_{lc1}$ and $C_{lc2}$ are respectively charged with are referred to as pixel voltages.

The first charge-sharing capacitor $C_a$ is charged with a voltage lower than the data voltage.

When the gate-on voltage Von is applied to the i-th gate line $GL_i$, the second switching device T2 is turned on, and the common voltage Vcom is applied to the output terminal of the second switching device T2. Therefore, the second charge-sharing capacitor $C_b$ is charged with a voltage corresponding to the difference between the data voltage Vd and the common voltage Vcom. For convenience, assume that the common voltage Vcom is 0 V.

Thereafter, when the gate-off voltage Voff is applied to the i-th gate line $GL_i$, the first and second sub-pixels SP1 and SP2 are electrically isolated from the j-th data line $DL_j$. That is, the first and second sub-pixel electrodes, which are charged with different voltages, maintain to be electrically floated from the j-th data line $DL_j$ in response to the gate-off voltage Voff.

When the gate-on voltage Von is applied to the (i+1)-th gate line $GL_{i+1}$, the data voltage is applied to each of first and second sub-pixel electrodes of a pixel belonging to an (i+1)-th row through a first switching device (not shown) connected to the (i+1)-th gate line $GL_{i+1}$, and the third switching device T3 is turned on. Then, the output terminal of the second switching device T2 and the second sub-pixel electrode of the pixel belonging to the i-th row are electrically connected, and the first charge-sharing capacitor $C_a$ and the second charge-sharing capacitor $C_b$ are connected in parallel. The first charge-sharing capacitor $C_a$ is already charged with a voltage higher than the data voltage Vd and the second charge-sharing capacitor $C_b$ is already charged with a voltage lower than the data voltage Vd due to the application of the gate-on voltage Von to the i-th gate line $GL_i$. Accordingly, the difference between voltages respectively applied to both sides of the first charge-sharing capacitor $C_a$ increases due to the influence of the second charge-sharing capacitor $C_b$, and thus, the difference between the data voltages respectively stored in the first and second sub-pixel electrodes of the pixel belonging to the i-th row also increases. That is, the data voltage of the first sub-pixel electrode increases, whereas the data voltage of the second sub-pixel electrode decreases.

The pixel voltages of the first and second sub-pixel electrodes of the pixel belonging to the i-th row will hereinafter be described in further detail. Referring to FIG. 2, a first node N1 is disposed between the output terminal of the first switching device T1 and the first liquid crystal capacitor $C_{lc1}$, a second node N2 is disposed between the first charge-sharing capacitor $C_a$ and the second liquid crystal capacitor $C_{lc2}$, and a third node N3 is disposed between the output terminal of the second switching device T2 and the second charge-sharing capacitor $C_b$. The second node N2 may also be interpreted as being disposed between the first charge-sharing capacitor $C_a$ and the output terminal of the third switching device T3. Likewise, the third node N2 may also be interpreted as being disposed between the output terminal of the second switching device T2 and the output terminal of the third switching device T3.

For convenience, it is assumed that the common voltage Vcom, which is applied to the storage line SL, is 0 V, that the data voltage Vd is a relative voltage to the common voltage Vcom, and that the first and second storage capacitors $C_{st1}$ and $C_{st2}$ are not provided.

When the gate-on voltage is applied to the i-th gate line $GL_i$, the first switching device T1 is turned on, and the data voltage Vd is applied to the first node N1. Also, the second switching device T2 is turned on, and the common voltage Vcom is applied to the third node N3. Therefore, the voltage at the first node N1 becomes the same as the data voltage Vd, and the voltage at the third node N3 becomes 0 V. According to the voltage divider rule, the voltage at the second node N2 satisfies the following equation:

$$\frac{Cm}{Cl + Cm} \cdot Vd.$$

Then, the first liquid crystal capacitor $C_{lc1}$, the second liquid crystal capacitor $C_{lc2}$, the first charge-sharing capacitor $C_a$ and the second charge-sharing capacitor $C_b$ have charge quantities Qh, Ql, Qm and Qn, respectively. The charge quantities Qh, Ql, Qm and Qn may be defined by Equation (1):

$$Qh = Ch \times Vd \qquad (1)$$
$$Ql = Qm = \frac{Cl \cdot Cm}{Cl + Cm} \cdot Vd$$
$$Qn = Cn \times Vd$$

where Ch indicates the capacitance of the first liquid crystal capacitor $C_{lc1}$, Cl indicates the capacitance of the second liquid crystal capacitor $C_{lc2}$, Cm indicates the capacitance of the first charge-sharing capacitor $C_a$ and Cn indicates the capacitance of the second charge-sharing capacitor $C_b$.

Thereafter, the gate-off voltage Voff is applied to the i-th gate line $GL_i$, and the gate-on voltage is applied to the (i+1)-th gate line $GL_{i+1}$. Then, the first and second switching devices T1 and T2 are turned off, the third switching device T3 is turned on, and the first liquid crystal capacitor $C_{lc1}$, the second liquid crystal capacitor $C_{lc2}$, the first charge-sharing capacitor $C_a$ and the second charge-sharing capacitor $C_b$ have charge quantities Qh', Ql', Qm', and Qn'. The charge quantities Qh', Ql', Qm' and Qn' may be defined by Equation (2):

$$Qh' = Ch \times V1 \qquad (2)$$
$$Ql' = Cl \times V2$$
$$Qm' = Cm(V1 - V2)$$

-continued $$Qn' = Cn \times (V1 - V2).$$

Since the total charge quantity of the capacitors connected to the first node N1 is maintained, the charge quantities Qh, Qm, Qn, Qh', Qm', and Qn' satisfy Equation (3):

$$Qh+Qm+Qn=Qh'+Qm'+Qn' \qquad (3).$$

In addition, since the total charge quantity of the capacitors connected to the first node N1 is also maintained, the charge quantities Qh, Qm, Qn, Qh', Qm', and Qn satisfy Equation (4):

$$Ql-Qm-Qn=Ql'-Qm'-Qn' \qquad (4).$$

The voltage V1 of the first node N1 and the voltage V2 of the second node N2 can be calculated using Equations (1) through (4), as indicated by Equation (5):

$$V1 = Vd\left[1 + \frac{Cl \cdot Cm \cdot Cn}{P(Cl+Cm)}\right] \qquad (5)$$

$$V2 = Vd\frac{Cm}{Cl+Cm}\left[1 - \frac{Ch \cdot Cn}{P}\right]$$

where P=Cl·Ch+(Cl+Cl)(Cm+Cn). Here, V1>Vd and V2<Vd Since Ch·Cn<P, V2<Vd, and Cm<(Cl+Cm).

If the data voltage Vd is a positive voltage greater than the common voltage Vcom, the pixel voltage (V1) of the first sub-pixel SP1 becomes greater than the data voltage Vd, and the pixel voltage (V2) of the second sub-pixel SP2 becomes lower than the data voltage Vd. In contrast, if the data voltage Vd is a negative voltage lower than the common voltage Vcom, the pixel voltage (V1) of the first sub-pixel SP1 becomes lower than the data voltage Vd, and the pixel voltage (V2) of the second sub-pixel SP2 becomes higher than the data voltage Vd. Therefore, the absolute value of the pixel voltage (V1) of the first sub-pixel SP1 is always greater than the absolute value of the pixel voltage (V2) of the second sub-pixel SP2.

When the first and second sub-pixels have different pixel voltages, the lateral visibility of an LCD can be improved. That is, a pair of gray voltage sets that originate from the same image data and have different gamma curves are stored in the first and second sub-pixels SP1 and SP2, and a gamma curve of the pixel having the first and second sub-pixels SP1 and SP2 may become the same as a gamma curve obtained by synthesizing the gamma curves stored in the first and second sub-pixels SP1 and SP2. A pair of gray voltage sets may be determined so that a synthesized gamma curve for the front of an LCD and a synthesized gamma curve for either side of an LCD can both become similar to a reference gamma curve for the front of an LCD. In this manner, it is possible to improve the lateral visibility of an LCD.

In addition, since the data voltage Vd is provided to the first and second sub-pixels SP1 and SP2 with the use of only one switching device, e.g., the first switching device T1, it is possible to simplify the structure of a liquid crystal panel assembly and increase the aperture ratio of an LCD, compared to the case when the data voltage Vd is provided to the first and second sub-pixels SP1 and SP2 with the use of more than one switching device.

Figure 3:
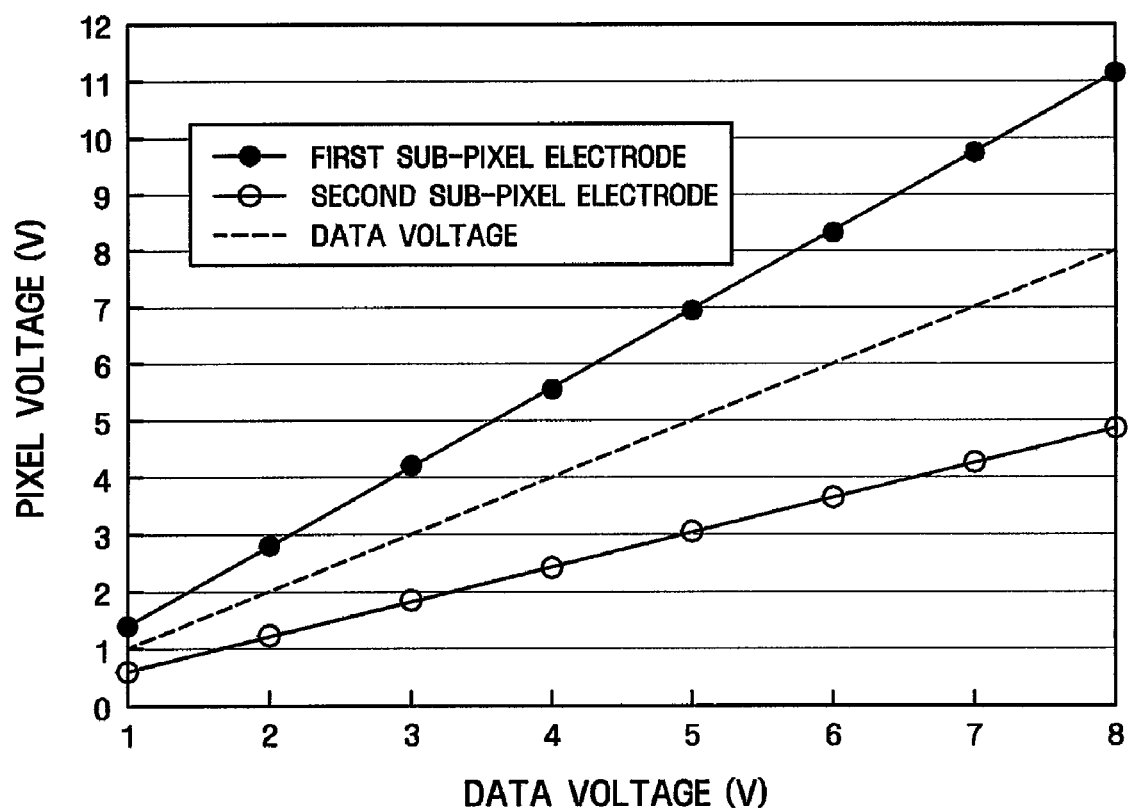
FIG. 3 illustrates a graph showing the variation of a pixel voltage of the LCD illustrated in FIG. 1 with respect to data voltage.

FIG. 3 illustrates a graph of variations in the pixel voltages of first and second sub-pixel electrodes with respect to a data voltage applied to the first and second sub-pixels through a data line. The graph of FIG. 3 is based on the assumption that the capacitance Ch of the first liquid crystal capacitor $C_{lc1}$, the capacitance Cl of the second liquid crystal capacitor $C_{lc2}$, the capacitance Cm of the first charge-sharing capacitor $C_a$ and the capacitance Cn of the second charge-sharing capacitor $C_b$ satisfy the equation:

Ch:Cl:Cm:Cn=5:4:10:50.

Referring to FIG. 3, when a data voltage of 5 V is applied, the pixel voltage of the first sub-pixel electrode increases by 2 V and thus becomes 7 V, whereas the pixel voltage of the second sub-pixel electrode decreases by 2V and thus becomes 3 V. Therefore, it is possible to secure a sufficient difference between the pixel electrodes of the first and second sub-pixel electrodes.

The pixel voltages of the first and second sub-pixel electrodes may be adjusted by setting the capacitance Ch of the first liquid crystal capacitor $C_{lc1}$ to be the same as or similar to the capacitance Cl of the second liquid crystal capacitor $C_{lc2}$ and appropriately adjusting the capacitance Cm of the first charge-sharing capacitor $C_a$ and the capacitance Cn of the second charge-sharing capacitor $C_b$. For example, when the ratio of the capacitance Cm of the first charge-sharing capacitor $C_a$ and the capacitance Cn of the second charge-sharing capacitor $C_b$ ranges from 1:2 to 1:5, it is possible to secure a sufficient difference between the pixel voltages of the first and second sub-pixel electrodes and thus to improve the lateral visibility of an LCD.

In addition, when the ratio of the sum of the capacitance Cm of the first charge-sharing capacitor $C_a$ and the capacitance Cl of the second liquid crystal capacitor $C_{lc2}$ and the capacitance Cn of the second charge-sharing capacitor $C_b$, i.e., (Cm+Cl):Cn, ranges from 1:1 to 1:4, it is possible to secure a sufficient difference between the pixel voltages of the first and second sub-pixel electrodes and thus to improve the lateral visibility of an LCD.

Figure 4:
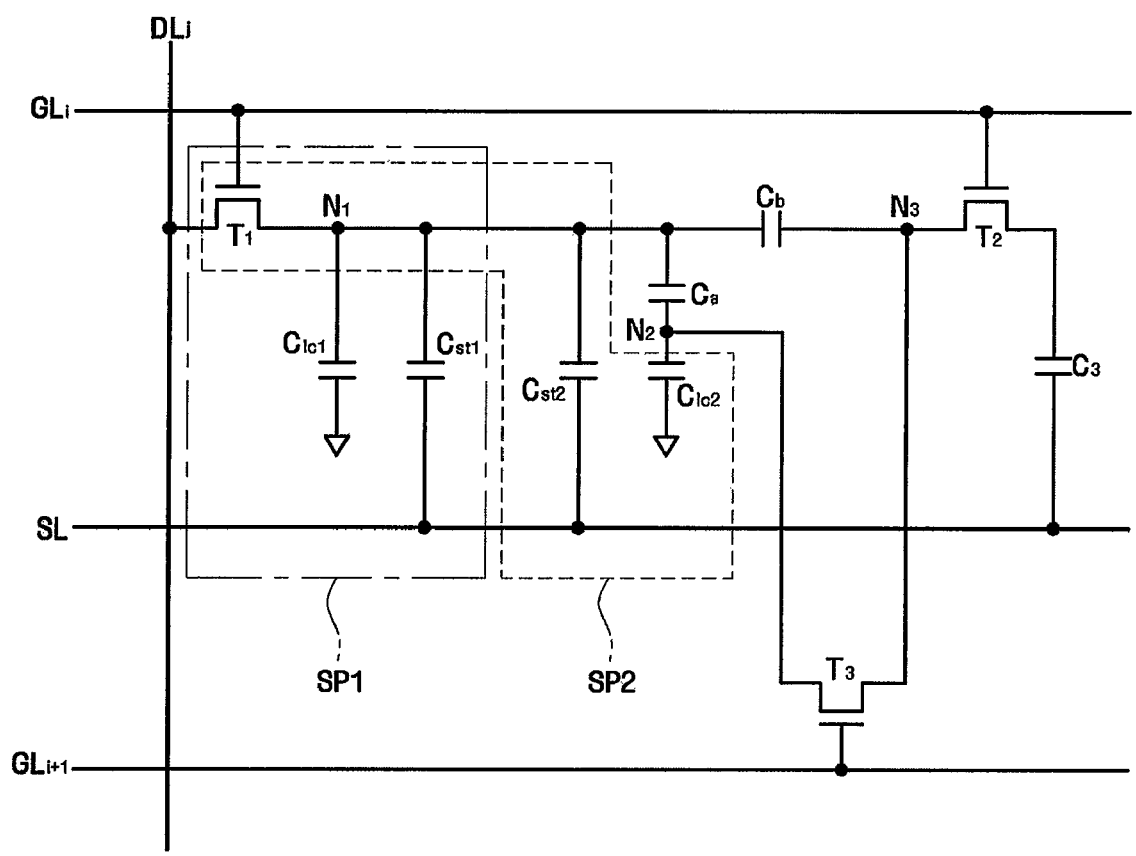
FIG. 4 illustrates a circuit diagram of a pixel of an LCD according to another embodiment of the present invention.

An LCD according to another embodiment of the present invention will hereinafter be described in detail with reference to FIG. 4. FIG. 4 illustrates a circuit diagram of a pixel of an LCD according to another embodiment of the present invention. In FIGS. 1, 2 and 4, like reference numeral indicate like elements, and thus, detailed descriptions thereof will be skipped. The LCD of the embodiment of FIG. 4 will hereinafter be described, mainly focusing on the differences with the LCD of the embodiment of FIGS. 1 and 2.

Referring to FIG. 4, a second switching device T2 includes a control terminal which is connected to an i-th gate line $GL_i$, an output terminal which is connected to an output terminal of a first switching device T1, and an input terminal which is connected to a storage line SL. Specifically, the input terminal of the second switching device T2 is connected to the storage line SL through an auxiliary capacitor C3. Since the input terminal of the second switching device T2 and the storage line SL are located on different levels, it may be difficult to directly connect the input terminal of the second switching device T2 to the storage line SL. In this case, the input terminal of the second switching device T2 may be connected to the storage line SL through an auxiliary capacitor C3, thereby facilitating the manufacture of the LCD.

In the embodiment of FIG. 4, like in the embodiment of FIGS. 1 and 2, when a pixel voltage V1 of a first sub-pixel SP1 is different from a pixel voltage V2 of a second sub-pixel SP2 due to the operations of first and second charge-sharing capacitors $C_a$ and $C_b$, it is possible to improve the lateral visibility of the LCD.

As described above, according to the present invention, a pixel electrode is divided into a pair of sub-pixel electrodes, and charge sharing is performed so that the sub-pixel electrodes can have different pixel voltages. Therefore, it is possible to improve the lateral visibility of an LCD. In addition, according to the present invention, a switching device is connected to one end of a charge-sharing capacitor, which performs charge sharing, so that the difference between the pixel voltages of the sub-pixel electrodes can increase. Therefore, it is possible to further improve the lateral visibility of an LCD. Moreover, according to the present invention, a data voltage is applied to the sub-pixel electrodes with the use of only one switching device. Therefore, it is possible to reduce the number of switching devices necessary for controlling the sub-pixel electrodes and to increase the aperture ratio of the LCD.

While the present invention has been particularly shown and described with reference to exemplary embodiments thereof, it will be understood by those of ordinary skill in the art that various changes may be made in the form and details without departing from the spirit and scope of the present invention as defined by the following claims.

What is claimed is:

1. A liquid crystal display (LCD), comprising:
   first and second gate lines which are arranged in parallel with each other and sequentially transmit a gate voltage;
   a data line which intersects the first and second gate lines and transmits a data voltage;
   a pixel electrode which is disposed in a pixel and comprises first and second sub-pixel electrodes that are connected to each other through a first charge-sharing capacitor;
   a first switching device which is connected to the first gate line, the data line and the first sub-pixel electrode;
   a second switching device which is connected to the first sub-pixel electrode through a second charge-sharing capacitor; and
   a third switching device which is connected to the second gate line and the second sub-pixel electrode and is also connected to the first sub-pixel electrode through the second charge-sharing capacitor.

2. The LCD of claim 1, further comprising a storage line which extends in parallel with the first gate line and transmits a common voltage, wherein the second switching device comprises a control terminal which is connected to the first gate line, an output terminal which is connected to the second charge-sharing capacitor, and an input terminal which is connected to the storage line.

3. The LCD of claim 2, wherein the input terminal of the second switching device is directly connected to the storage line.

4. The LCD of claim 3, wherein the second charge-sharing capacitor is charged with a voltage corresponding to the difference between the data voltage and the common voltage, if a gate-on voltage is applied to the first gate line.

5. The LCD of claim 2, wherein the input terminal of the second switching device is connected to the storage line through an auxiliary capacitor.

6. The LCD of claim 1, wherein the ratio of the capacitance of the first charge-sharing capacitor and the capacitance of the second charge-sharing capacitor ranges from about 1:2 to about 1:5.

7. The LCD of claim 1, further comprising a common electrode which faces the pixel electrode, wherein the ratio of the sum of the capacitance Cm of the first charge-sharing capacitor and the capacitance Cl of a liquid crystal capacitor and the capacitance Cn of the second charge-sharing capacitor [(Cm+Cl):Cn] ranges from about 1:1 to about 1:4.

8. A method of display, comprising:
   providing first and second gate lines which are arranged in parallel with each other and sequentially transmit a gate voltage;
   providing a data line which intersects the first and second gate lines and transmits a data voltage;
   providing a pixel electrode which is disposed in a pixel and comprises first and second sub-pixel electrodes that are connected to each other through a first charge-sharing capacitor;
   providing a first switching device which is connected to the first gate line, the data line and the first sub-pixel electrode;
   providing a second switching device which is connected to the first sub-pixel electrode through a second charge-sharing capacitor;
   providing a third switching device which is connected to the second gate line and the second sub-pixel electrode and is also connected to the first sub-pixel electrode through the second charge-sharing capacitor; and
   charge sharing between data voltages of the first and second sub-pixel electrodes, such that a pixel voltage of the first sub-pixel electrode becomes greater than the data voltage and a pixel voltage of the second sub-pixel electrode becomes lower than the data voltage.

* * * * *